United States Patent
Perron et al.

(10) Patent No.: US 11,144,613 B2
(45) Date of Patent: Oct. 12, 2021

(54) PLATFORM-INDEPENDENT PUBLISH-SUBSCRIBE

(71) Applicant: 2236008 Ontario Inc., Waterloo (CA)

(72) Inventors: Marc Perron, Kanata (CA); Darrin Kenneth John Fry, Kanata (CA)

(73) Assignee: BlackBerry Limited, Waterloo (CA)

( * ) Notice: Subject to any disclaimer, the term of this patent is extended or adjusted under 35 U.S.C. 154(b) by 466 days.

(21) Appl. No.: 15/720,715

(22) Filed: Sep. 29, 2017

(65) Prior Publication Data

US 2019/0102402 A1 Apr. 4, 2019

(51) Int. Cl.
| | |
|---|---|
| *G06F 16/958* | (2019.01) |
| *G06F 15/16* | (2006.01) |
| *H04L 12/58* | (2006.01) |
| *H04L 29/08* | (2006.01) |
| *H04L 12/24* | (2006.01) |

(52) U.S. Cl.
CPC ........... *G06F 16/958* (2019.01); *G06F 15/16* (2013.01); *H04L 41/026* (2013.01); *H04L 51/14* (2013.01); *H04L 51/16* (2013.01); *H04L 51/20* (2013.01); *H04L 67/02* (2013.01)

(58) Field of Classification Search
CPC .................................................... H04L 41/026
See application file for complete search history.

(56) References Cited

U.S. PATENT DOCUMENTS

| | | | |
|---|---|---|---|
| 7,349,980 B1 | 3/2008 | Darugar et al. | |
| 2008/0294794 A1* | 11/2008 | Darugar | H04L 67/02 709/238 |
| 2009/0094112 A1* | 4/2009 | Cesarini | H04L 12/1457 705/14.36 |
| 2009/0240829 A1* | 9/2009 | Hildebrand | H04L 67/02 709/232 |
| 2011/0282921 A1 | 11/2011 | Dodge | |
| 2015/0288636 A1 | 10/2015 | Yalavarty et al. | |
| 2017/0031599 A1* | 2/2017 | Bowman | G06F 3/061 |
| 2017/0161282 A1 | 6/2017 | Kemme et al. | |
| 2017/0180289 A1* | 6/2017 | Chiappone | H04L 67/22 |

OTHER PUBLICATIONS

EPO, Extended European Search Report relating to EP application No. 18188836.3, dated Mar. 20, 2019.

* cited by examiner

*Primary Examiner* — Nicholas P Celani
(74) *Attorney, Agent, or Firm* — Rowand LLP

(57) ABSTRACT

A system and method connects multiple diverse publish-subscribe systems and a platform-independent interface that exchanges messages between publishers and subscribers. The system and method connects a software application and the platform-independent interface and exchanges multiple messages between two or more diverse publish-subscribe systems and the software application. The two or more diverse publish-subscribe systems run concurrently.

27 Claims, 9 Drawing Sheets

Provider Initialization

```
int
main( int argc, char* argv[] )
{
    int i ;
    pips_provider_t* provider ;
    const char* const* registered_providers ;
    int num_providers = pips_get_registered_providers( &registered_providers ) ;

for ( i = 0 ; i < num_providers ; ++i ) {
        /* Initialize the i-th provider. */
        pips_provider_t* provider = pips_get_provider( registered_providers[ i ] ) ;
        pips_init_provider( provider, NULL, NULL ) ;
    }

/* Get the default provider */
    provider = pips_get_provider( NULL ) ;
```

FIG. 3 number-impl.cxx - Exposing a C++ TypeImpl in C linkage

```
NumberType NumberType::m_impl ;

TypeImpl*
NumberType::Impl()
{
    return &m_impl ;
} extern "C" {
    FASTRTPSTypeImpl*
    FASTRTPSNumber_getImpl()
    {
        return NumberType::Impl() ;
    }
}
```

FIG. 4 number-plugin.c - Pluggable Type Module Requirements

```
extern FASTRTPSTypeImpl* FASTRTPSNumber_getImpl() ;
static FASTRTPSType FASTRTPSType_Pluggable_Number = {
    .name = "PluggableNumber",
    .impl = FASTRTPSNumber_getImpl(),
} ;

int
FASTRTPSType_load( FASTRTPSProvider* provider, void* handle )
{
    int rc = -1 ;
    if ( FASTRTPSType_Pluggable_Number.handle ) {
        errno = EALREADY ;
    }
    else {
        rc = FASTRTPSProvider_register_type( provider, &FASTRTPSType_Pluggable_Number.as_PiPSType ) ;
    }
    return rc ;
}
```

FIG. 5

Enumerating a provider's root namespace.

```
pips_entity_t* entity = NULL ;
pips_namespace_t* root = pips_provider_root( provider ) ;
/* Enumerate the entities in the root namespace. */
while ( (entity = pips_namespace_next_child( root, entity )) ) {
    if ( pips_topic_narrow( entity ) ) {
        printf( "Topic: %s\n", entity->name ) ;
    }
    else if ( pips_namespace_narrow( entity ) ) {
        printf( "Namespace: %s\n", entity->name ) ;
    }
    else {
        printf( "Unknown Entity Type: %s\n", entity->name ) ;
    }
}
```

FIG. 6

Creating a publication for a PPSNode topic

```
pips_provider_t* provider = pips_get_provider( "FASTRTPS" );
if ( pips_init_provider( provider, "PPSNode Example", "typedef=PiPSType-fastrtps-PPSNode.so" ) == EOK ) {
    pips_namespace_t* ns = pips_provider_root( provider );
    pips_topic_t* topic = pips_namespace_create_topic( ns, "aNode", "PPSNode" );
    if ( topic ) {
        const char* pps_data = "bool_value:b:true\n"
            "number_value:n:1.0000\n"
            "json_value:json:{"key":"Some arbitrary string data"}\n"
            "string_value:Arbitrary string data";
        pips_publication_t* publication = pips_create_publication( topic, PIPS_PUBLISH|PIPS_SUBSCRIBE );
        pips_publication_write( publication, NULL, pps_data, PIPS_ENCODING_PPS, sizeof( pps_data ) );
    }
}
```

FIG. 7

```
# ls /pips
aNode
# cat /pips/aNode
@aNode<FASTRTPS::PPSNode>
bool_value:b:true
number_value:n:1.0000
json_value:json:{"key":"Some arbitrary string data"}
string_value::Arbitrary string data

```

FIG. 8

PLATFORM-INDEPENDENT PUBLISH-SUBSCRIBE

BACKGROUND OF THE DISCLOSURE

1. Technical Field

This disclosure relates to a multi-tier architecture and specifically to a publish and subscribe architecture that supports multiple publish and subscribe systems.

3. Related Art

Messaging architectures execute processes to deliver content. In publish-subscribe architectures senders of messages known as publishers organize messages into classes without having to know readers, which are called subscribers. When subscribers express an interest in one or more message classes, the subscribers receive messages of interest, without having to know publishers.

Many frameworks provide publish and subscribe functionality, with most operating independently with proprietary application programming interfaces. This means that the interface is specific to one system and that the frameworks do not share semantics, information, tools, priorities, etc., with other frameworks or may interface standard mechanisms. While independence in publish and subscribe frameworks allows for specialization, it also makes the systems susceptible to bottlenecks, failures when mission critical components fail, obsolescence when the framework cannot communicate with a developing technology, and unscalable due to proprietary application programming interfaces.

BRIEF DESCRIPTION OF THE DRAWINGS

The disclosure is better understood with reference to the following drawings and description. The elements in the figures are not necessarily to scale, emphasis instead being placed upon illustrating the principles of the disclosure. Moreover, in the figures, like referenced numerals designate corresponding parts throughout the different views.

FIG. 3 is a publish-subscribe provider initialization process flow.
FIG. 4 is a data-type exposure process flow.
FIG. 5 is a data-type pluggable mount.
FIG. 6 is an enumerating service process flow.
FIG. 7 is a process for creating a publication.
FIG. 8 is process for reading sample data read via a platform-independent publish and subscribe files system.

DETAILED DESCRIPTION

Platform-independent Publish and Subscribe (PiPS) systems and processes (referred to as a PiPS system, a PiPS framework, or a platform-independent interface) provide publish-subscribe functionality to software applications. The PiPS systems provide seamless access to diverse publish-subscribe middleware enabling multiple independent publish-subscribe systems to run transparently, concurrently, and severally in response to one or more software applications. The PiPS system is extensible supporting new and developing publish-subscribe services besides legacy systems. The systems support added publish-subscribe functionality, publish-subscribe enhancements, and modifications to existing publish-subscribe functionality without requiring changes to the software applications requesting publish-subscribe functionality. In the PiPS system, high priority tasks are not directly or indirectly preempted by lower priority tasks (e.g., priority inversion), and publish-subscribe functions can be executed via multiple message threads. The software applications requesting publish-subscribe services control the number of message threads that the PiPS system manages. Each software application executes its own thread or runs multiple threads severally, serially, and/or concurrently. A thread generally comprises a message usually managed by a scheduler, which may be part of an operating system. A software application may be integrated with or a unitary part of a multi-media system, applications that enable vehicle operation such as operation of an advanced driver assistance system or modules that control or manage a self-driving vehicle. The software application may be also be integrated with or a unitary part of devices that communicate across the Internet of things, an application that communicate through an application program interface, and/or systems and processes that use publish-subscribe services.

Figure 1:
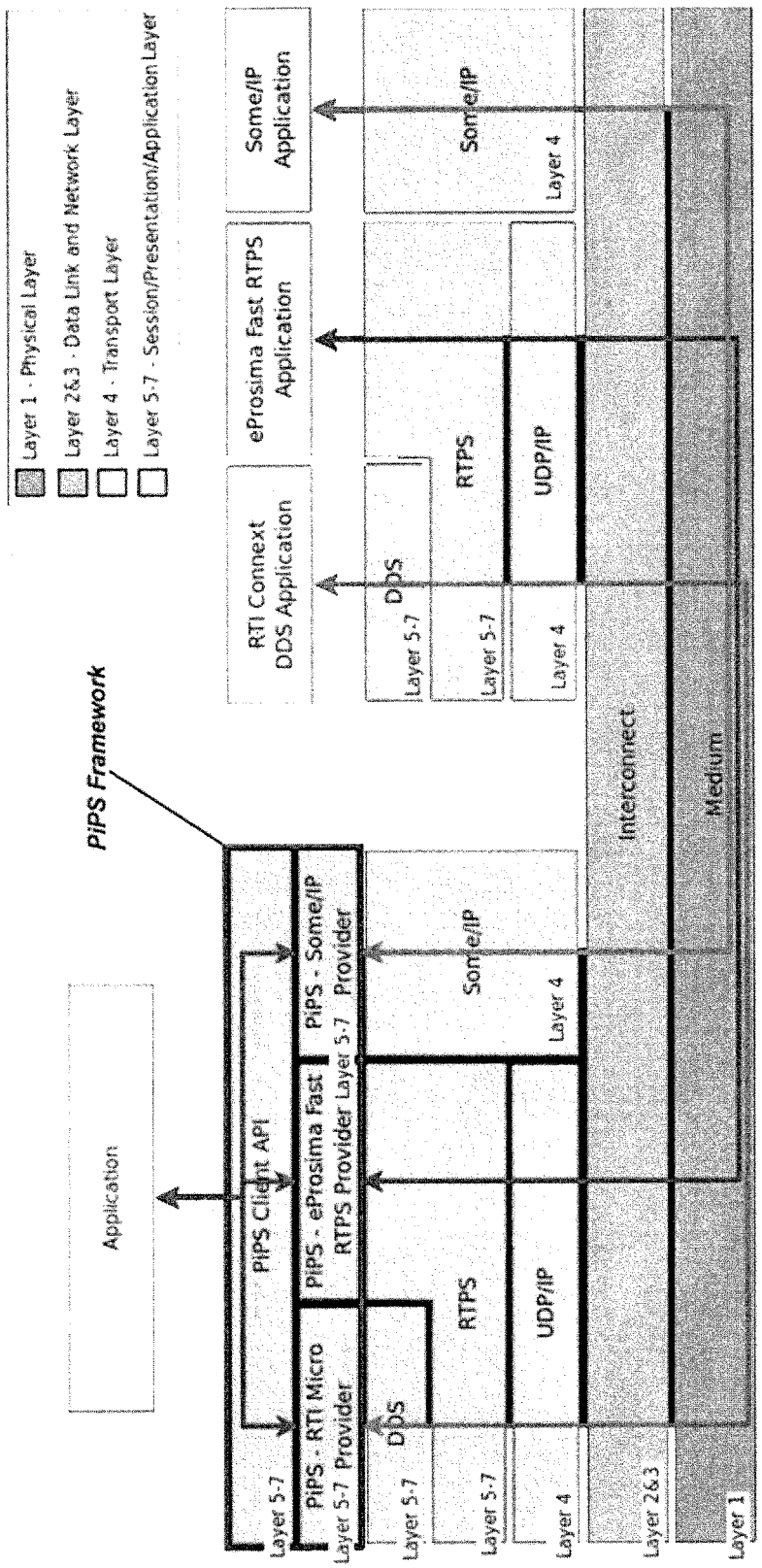
FIG. 1 is a communication model.

FIG. 1 is a communication model that illustrates communication tiers that serve the PiPS framework and a software application served by the PiPS framework. The architecture standardizes the communication between diverse publish-subscribe middleware and the requesting software applications without regard to device specific infrastructure that is required to provide and delivers publish-subscribe functionality. The systems provide an innovative architectural shift that integrates application layer, presentation layer, and session layer functionality into a single client application program interface. It provides interoperability to independent and diverse publish-subscribe systems that may provide common and different services.

In FIG. 1, the PiPS framework provides services rendered by local or remote publish-subscribe sources including, for example, an RTI (Real-Time Innovations, Inc.) Connext DDS (Data Distribution Service) referred to as the Connext application, an eProsima Fast RTPS (Real-Time Publish-Subscribe) referred to as the Fast-RTPS application and a SOME/IP (Scalable service-Oriented MiddlewarE over IP) referred to as the Some/IP application. The PiPS framework may also service local or remote publish-subscribe source applications that deliver low-latency and real-time publish-subscribe messaging services to monitor and control physical systems and processes. The applications may use a small-footprint modular messaging components that provide publish-subscribe services for resource-limited devices that have relatively low memory, Flash, CPU power or no operating system. Other local or remote publish-subscribe sources serviced by PiPs may execute in real-time performance environments while remaining in compliance with stringent resource constraints. By abstracting out low-level networking and communication details and providing a flexible integration framework, the sources reduce the amount of device-specific code or application-specific code needed and reduces development costs. Other local or remote publish-subscribe sources serviced by PiPs are an open source high performance publish-subscribe framework. These publish-subscribe sources provide publish-subscribe services through a decoupled model based on publishers, subscribers and data topics. The publish-subscribe framework generates publish-subscribe code from the topic definitions using libraries and an Interface Definition Language (IDL) allowing developers to create application logic without focusing on the domain specific networking details. Another local or remote publish-subscribe source supported by PiPs is an automotive middleware framework that controls the publication and subscription of messages within vehicles. This framework supports features of the Infotainment domain as well as that of other domains in the vehicle, allowing the framework to be used for high-speed multimedia network technology optimized by the automotive industry. The framework is an effective replacement for the daisy-chain topology used on the Media Oriented Systems Transport (MOST) bus applications as well in some Controller Area Network (CAN) bus applications.

In the seven-tier communication model of FIG. 1, the PiPS framework provides services through the integration of an application layer, a presentation layer, and a session layer. The application layer is the communication layer closest to the software application requesting publish-subscribe services. The application layer interacts with remote and local software applications and implements a communicating component. Application-layer functions may include identifying one or more publish-subscribe frameworks, determining resource availability, and/or synchronizing communication. When identifying one or more publish-subscribe applications toy serve the software application, the application layer determines the identity and availability of the one or more publish-subscribe providers. The determination may be made directly in response to a request from the software application or indirectly in response to the software applications delivery or request of a certain data type. Alternatively, the application layer may assign an affinity status to one or more publish-subscribe providers in response to a prior publish-subscribe exchange with a software application, from a designation written within a configuration file stored in memory, or upon a specific request from one or more software applications. An affinity generally comprises a preference that causes the PiPS framework to route future publish-subscribe requests and publications to a specific publish-subscribe provider or provider module or two or more publish-subscribe providers or provider modules.

The presentation layer of the PiPS framework establishes context between software applications and publish-subscribe entities, in which the software application-layer entities may use different syntax and semantics than publish-subscribe entities. The presentation service provides a mapping between them. The presentation layer translates between the software application and publish-subscribe formats. The presentation layer transforms data into forms that the application and publish-subscribe providers both accept. The session layer controls the connections between the PiPS framework and publish-subscribe entities. It establishes, manages, and terminates the connections between the local and remote software application and the publish-subscribe providers serving them.

A layer serves the layer above it and is served by the layers below it in FIG. 1. As such, the PiPS framework is served by a data link layer, a network layer, and a physical layer associated with the publish-subscribe providers as shown in FIG. 1. The data link layer provides node-to-node data transfer. It provides the link between two or more connected nodes. The network layer provides the means for transferring data. A network is the medium that connects the nodes, which permits nodes connected to it to transfer data to other nodes directly or through intermediate nodes. The physical layer establishes the physical specifications of the data connections.

In the PiPS framework, the application software or clients are aware of providers, namespaces, topics, and publications. A provider generally comprises a stub that encapsulates publish-subscribe middleware (e.g., Connext, Fast-RTPS, Some/IP, etc.). The provider exposes an interface that allows a client library within the PiPS framework to initialize the transport mechanisms and manage topics, publications and namespaces. A namespace allows for the logical grouping of topics and sub-namespaces. Each publish-subscribe provider has a single root namespace. A topic represents a particular type of data exchanged between end-points in the PiPS framework. A publication allows a software application to either receive updates for a given topic or a group of topics (subscribe), broadcast updates for a given topic or group of topics (publish), or both. Updates to the topic associated with the publication may be dispatched to subscribers that have requested updates from the publication's owner.

Figure 2:
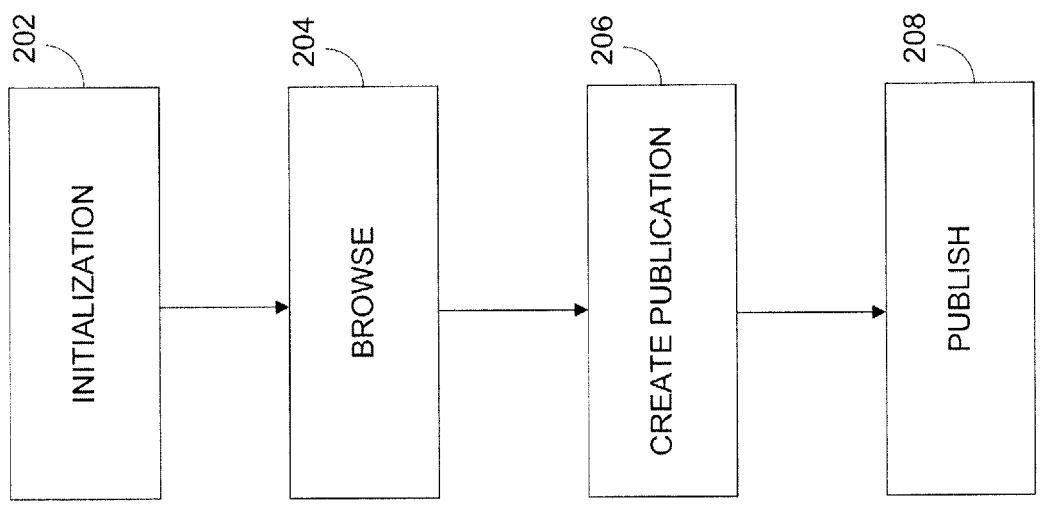
FIG. 2 is a publication process.

As shown in FIG. 2, a publication application of the PiPS framework begins by initializing the provider(s) at 202 for the publish-subscribe middleware with which it interacts. Once the provider(s) is/are successfully initialized, the client software application may browse the root namespace(s) at 204 to identify the relevant topics it wishes to engage in or create the topics it wishes to publish. When a desired topic is identified or created, the client software application may create a publication at 206 to exchange data with other publishers/subscribers of the same topic and publish at 208. The other end-points need not use the PiPS framework for the application to be able to communicate with them so long as they are known to the publish-subscribe provider.

A PiPS provider generally comprises a pluggable stub for a publish-subscribe middleware application. The PiPS provider initializes the middleware so it is encapsulated to interact with its software application clients. A PiPS provider may create/delete namespaces. If the encapsulated publish-subscribe system does not support the creation of logical groups, the creation and deletion of namespaces may be implemented by the provider itself, or not supported at all, making the creation and deletion of namespaces optional. If namespaces are not supported by a provider, topics may be created in the provider's root namespace. Further, a publish-subscribe provider to the PiPS framework may create or delete publications and read or write topic data to or from other end-points.

Publish-subscribe providers are registered with the PiPS framework before they are accessed. One or more publish-subscribe providers may register automatically in response to a third-party local or remote request to register publish-subscribe middleware. The PiPS framework uses a factory design pattern that allows software applications to query the list of registered publish-subscribe providers with the PiPS framework. The factory is a singleton that manages the publish-subscribe providers. The singleton restricts instantiation to one object that coordinates the actions across the PiPS framework. When registered, the singleton becomes automatically aware of publish-subscribe providers and by its registration the publish-subscribe providers automatically become accessible to client software applications. Once accessible, clients may initialize one or more of the registered publish-subscribe providers to interact with other end-points that are participants in the encapsulated middleware.

A publish-subscribe provider initialization event may be implemented by using the Int main ( ) method shown in FIG. 3. When a client asks for a list of registered publish-subscribe providers, such as what may occur at start-up, the PiPS framework provides a list of names of those publish-subscribe providers. The publish-subscribe provider list is constructed by linking shared libraries, that may be defined in a configuration file, and may be updated at run-time, or at initialization time via command line arguments (by loading pluggable provider libraries). After collecting a list of all of the publish-subscribe providers, the providers may provide the configuration parameters they are willing to accept. The first NULL argument in pips_init_provider(provider, NULL, NULL) specifies the publish-subscribe application name and the second NULL argument allows the publish-subscribe provider to establish the configuration parameters the publish-subscribe provider accepts. This routine allows for cascading configuration options. The options are provided by the initialization function and override options defined in the provider's configuration file, which override the built-in default configurations. A publish-subscribe affinity may also be established during an initialization event, making one or more publish-subscribe providers default publish-subscribe services unless a client application provides a specific publish-subscribe provider request. The use of an assigned affinity is particularly useful when interfacing a software application to a publish-subscribe provider as it allows developers to write applications using open source publish-subscribe middleware at no expense before interfacing a licensed publish-subscribe provider that may be required to achieve an International Organization of Standardization (ISO) certification.

The PiPS framework may be integrated with publish-subscribe middleware that in some implementations, may be assigned a default affinity. The PiPS framework also supports a number of built-in data types. Some built-in data types that may be used includes Boolean, number, and string data types. Boolean data types enables end-points to exchange of Boolean values (true or false). Boolean data types support Persistent Publish/Subscribe (PPS) and CSTRUCT encoding. CSTRUCT encoding serializes and deserializes from/to a buffer holding a standard C Boolean value. The PPS encoding serializes and deserializes to/from stringified expression of a Boolean flag and allows the attribute name to arbitrarily be specified. The number data type allows end-points to exchange double precision floating-point values. This data type supports PPS and CSTRUCT encoding. The CSTRUCT encoding serializes and deserializes from/to a buffer holding a standard C double value. The PPS encoding serializes and deserializes to/from a stringified expression of a number and allows the attribute name to arbitrarily be specified. The string data-type allows end-points to exchange arbitrarily long character string values. This data type supports PPS and CSTRUCT encoding. The CSTRUCT encoding serializes and deserializes from/to a buffer of standard C character values with a NULL-terminator. The PPS encoding allows the attribute name to arbitrarily be specified.

The PiPS framework also supports pluggable type definitions, some of which may be provided by publish-subscribe providers. By supporting pluggable type definitions the PiPS framework supports custom data types that may be loaded into the run-time environment to support publish-subscribe services beyond the built-in types provided by default. This capability may be utilized by the PiPS files system (PiPS-FS) service that creates a PPSNode data type. The new data type for a provider is generated by creating a specialization that is transparent to clients, Defining a custom type for the Fast RTPS provider involves creating a specialization of the TypeImpl( ) and TypeInstance( ) classes with custom implementations of the following virtual functions: TypeImpl::createInstance( ); TypeInstance::initSample( ); TypeInstance::operator=( ); TypeInstance::getData( ). Any number of the following virtual methods can optionally be implemented to support serialization of the type's data in the associated encoding: TypeImpl::readPPS( ); TypeImpl::writePPS( ); TypeImpl::readCSTRUCT( ); TypeImpl::writeCSTRUCT( ). In order to support point-to-point publications of custom type data, an implementation of the TypeImpl::setKey( ) function must be provided.

The pluggable definition types that may be dynamically loaded at run-time may be defined in the C programming language in a separate compilation unit, and linked to the C++ programing language. An accessor function returns a pointer to the C++ implementation as a pointer to the base TypeImpl structure. A Number built-in data-type may expose its implementation as shown in FIG. 4. In FIG. 4, the numberType provides access to the singleton impl( ) and the extern "C" component makes the C++ singleton accessible to the C infrastructure.

To register a data type when a publish-subscribe module is loaded, a FASTRTPSType_load( ) method is used as shown in FIG. 5. The Pluggable_Number identifies the publish-subscribe provider and the registration_type registers the publish-subscribe provider with the data-type used in its implementation. A similar type API will be exposed by any PiPS provider implementation that allows for pluggable types. Contents of a namespace may be given to the publish-subscribe providers through the enumerating service shown in FIG. 6. In FIG. 6, the provider_root ( ) identifies the root namespace for a given provider and the while loop identifies an entity, which is designated as the base class of a topic, a namespace, or an unknown data type. The if-else statement determines if the entity name is a topic, a namespace, or an unknown entity type.

In the PiPS framework, publishers may define sub-namespaces to group topics together. From the client's perspective, a namespace will expose functions to enumerate its contents, which will consist of topics or other namespaces. Additionally, the namespace will expose functions to create new topics. Depending on the configuration, distinct topics with the same name may exist in multiple namespaces for the same provider.

In the PiPS framework, a topic generally comprises a type of data exchanged between end-points of the publish-subscribe middleware. A topic does not represent the data itself, but rather it generally describes how the data is composed, Encoder and decoder routines are associated with each topic to support reading and writing of data in those formats, which are established by the publish-subscribe providers. Data exchanged for a given topic are designated as samples. Samples represent the change-sets associated with a particular instance of a topic.

A publication expresses a session in which data for a given topic is exchanged between end-points in the PiPS framework. A publication has zero or more authors (publishers), zero or more readers (subscribers), a subject (topic), and none or multiple issues (sessions). Data may be exchanged for topics through existing publications. In some implementations, publications may be created using namespaces as a topic; thus, allowing end-points to exchange groups of topic data atomically.

Publications expose functions to support reading topic data, encoding it in a desired format, and writing topic data encoded in a particular format. Provider implementations ensure that the proper encoding and decoding routines are defined for each topic. The PPS encoding scheme operates with structured string data that conforms the format expected for PPS service. The CSTRUCT encoding scheme operates on a C struct's member fields directly in the PiPS framework making it more flexible. The layout of the C struct is defined a priori for both the client and the provider and is bound to a particular topic.

In the PiPS framework, each publication has a particular instance of a topic associated therewith. In some instances, distributed end-points may have different views of a topic contingent on the time at which sample updates arrive. Thus, topics are distinguishable from their instances; the former being the simple abstract structure of the information, the latter being the current view a publication has thereof.

When data is written to a publication, all subscribers of the associated topic in the PiPS framework receive the data samples. The PiPS framework also supports point-to-point communication. In this configuration, each end-point in the publish-subscribe domain is assigned to a Globally Unique Identifier (GUID). By specifying the GUID of the recipient when publishing a sample, the recipient will filter data samples to reject those that are not directed to those specified. Each provider is responsible for ensuring the GUIDs assigned to end-points are unique within its domain. Subscriber and Publisher GUIDs may be discovered via asynchronous events. Publisher GUIDs are also conveyed to subscribers when new data arrives to allow them to know the provenance of a data sample. This is useful for Remote Procedure Call (RPC) type interactions which requires responses to be sent only to the requesting peer.

The PiPS framework allows data to be delivered to clients asynchronously. A number of notifications or indications (e.g., an event trigger) may occur when the PiPS framework detects an action or occurrence (e.g., an event). Event triggers may be defined through a local or remote library accessed by the PiPS framework to support workflow and conserve system resources. An event trigger may allow a process to sleep and yield the processor to other threads; it need not execute continuously. It may be received through an event queue (event data waiting to be processed) and managed by an event manager at the subscriber or publisher. An event manager may comprise software or hardware.

Events may be time based or non-time based. Non-time based events may include the arrival of new publication data, the creation of a new topic, the addition of new publishers and subscribers for one or more existing topics. Some events may include a NEW_DATA event, a NEW_TOPIC event, a NEW_PUBLISHER event, DELETED_PUBLISHER event, NEW_SUBSCRIBER event, and a DELETED_SUBSCRIBER event. A NEW_DATA event indicates that a new sample was received for a given publication and provides the GUID of the publisher who wrote the data. A NEW_TOPIC event indicates that a new topic was created in the domain of a given provider and initiates an event trigger when a subscriber enables topic discovery or in some alternate frameworks, enabled by default. A NEW_PUBLISHER event indicates that a new publisher for a known topic has been added to a domain. The NEW_PUBLISHER event type will be received by subscribers in the domain. The remote publisher GUID and a handle to the relevant topic will be provided when the NEW_PUBLISHER event is received. A DELETED_PUBLISHER event indicates that an existing publisher was removed from the domain. Subscribers in the domain receive a DELETED_PUBLISHER event. The remote publisher GUID and a handle to the relevant topic is provided when the DELETED_PUBLISHER event trigger is received. A NEW_SUBSCRIBER event indicates that a new subscriber for a known topic was added to a domain. Publishers in the domain receive the NEW_SUBSCRIBER event. The remote subscriber GUID and a handle to the relevant topic is provide when the NEW_SUBSCRIBER event trigger is received. A DELETED_SUBSCRIBER event indicates that an existing subscriber has been removed from the domain. Publishers receive the DELETED_SUBSCRIBER trigger event. The remote subscriber GUID and a handle to the relevant topic is provided when this event trigger is received.

The PiPS framework supports current and legacy publish-subscribe infrastructure such as the PiPS system described in U.S. patent Ser. No. 12/780,400, entitled Publish-Subscribe System (PPS), which is incorporated by reference in its entirety. Further, the framework creates one or more file systems (PiPS-FS) that allow systems to browse topics defined in an underlying publish-subscribe middleware via standard shell commands (i.e. cd, 1s). Additionally, reading and writing topic data exposed in the file system may be executed through standard shell commands (i.e., cat, less, echo) by the topic implementations.

The PPSNode data type provide legacy support for applications to exchange data using PiPS-FS. PPSNode describes an arbitrary sequence of key-value pairs to create publications. Some of the values may include: a Boolean, Number (double precision floating-point), and JSON strings. Plug-ins may be defined for some or all of the underlying publish-subscribe infrastructure, such as Connext and Fast-RTPS that may be referenced by PiPSType-fastrtps-PPSNode.so and PiPSType-rti-micro-PPSNode.so, respectively. The PPSNode type defines encoder/decoder functions for PPS data.

FIG. 7 shows how PiPS framework may be extended to PPS by creating a topic of PPSNode type and a publication. The implementation gets the Fast-RTPS provider, initializes it, and creates a topic in a namespace. The argument ns represents the namespace the process is creating, aNode is the file the PPS creates, and PPSNode is the data type. In FIG. 7, the namespace shows up as a directory folder, which is at the root where the file system is mounted. The namespace shows up as a node in the root. If a topic is created successfully, in the if command the system defines some arbitrary PPS data and creates a topic and a publication on that topic. Thereafter, the process publishes.

FIG. 8 shows the processing sample data read via the PiPS-FS service. In FIG. 8 the PiPS-FS is mounted at /pips, data samples are read using the cat command as though the topic were a regular file.

Figure 9:
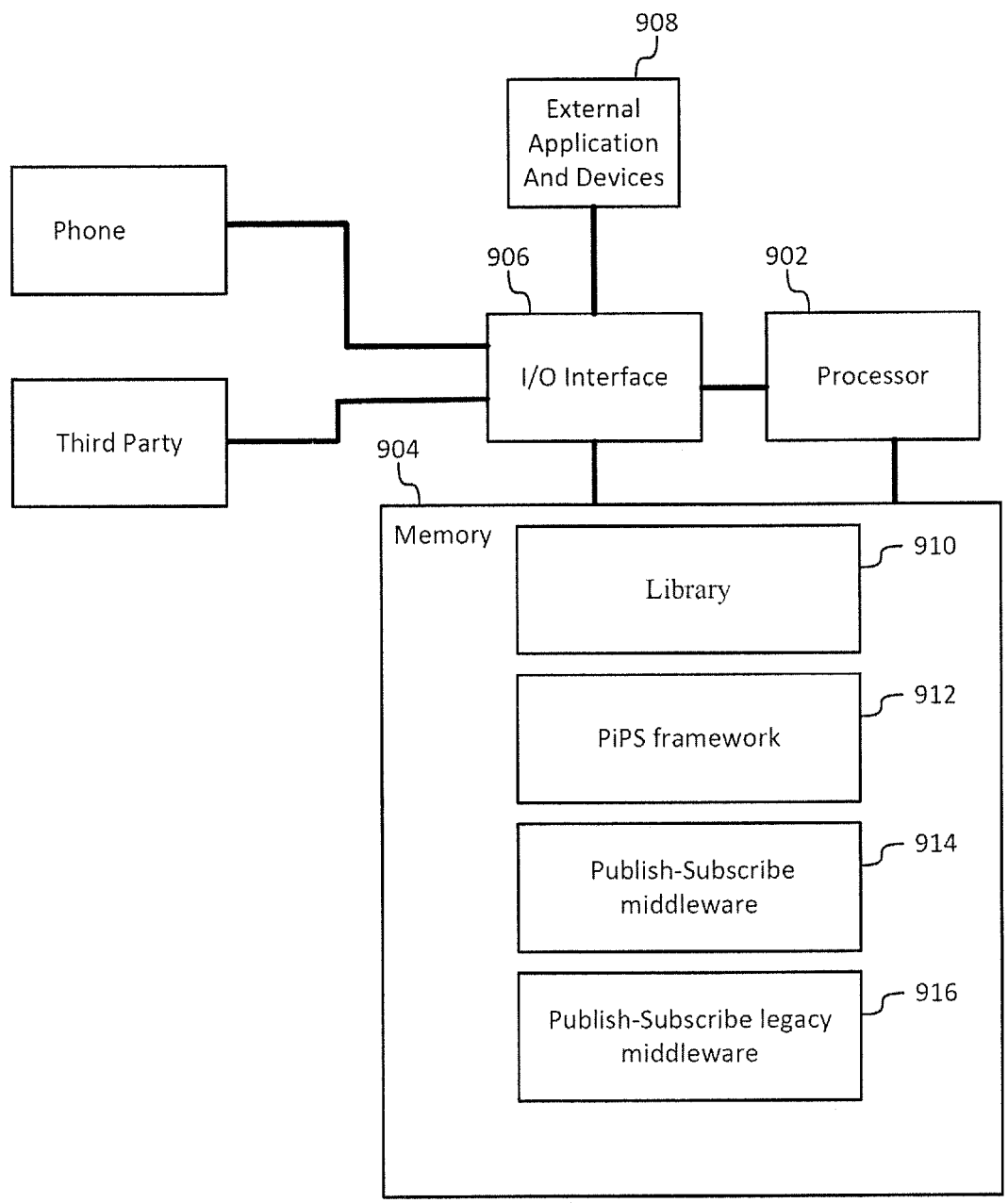
FIG. 9 is a block diagram of a platform-independent publish and subscribe system.

FIG. 9 is a block diagram of a PiPS framework that provides publish-subscribe services. The system comprises a processor 902, a non-transitory media such as a memory 904 (the contents of which are accessible by the processor 902) and an I/O interface 906. The I/O interface 906 connects publish-subscribe devices, publish-subscribe middle ware, and local and/or remote applications that use publish-subscribe services 908. The memory 904 may store instructions which when executed by the processor 902 causes the system to render some or all of the functionality associated with providing the PiPS framework and supporting publish-subscribe services. For example, the memory 904 may store instructions which when executed by the processor 902 causes the system to render the functionality associated with one or more publish-subscribe libraries 910, the PiPS framework 912, one or more optional publish-subscribe middleware (e.g., the underlying publish-subscribe infrastructure) 914, and an optional PPS system 916 that may be a unitary part or integrated in a vehicle or a phone.

The processors 902 may comprise a single processor or multiple processors that may be disposed on a single chip, on multiple devices, or distributed over more than one system. The processors 902 may be hardware that executes computer executable instructions or computer code embodied in the memory 904 or in other memory to perform one or more features of the systems described herein. The processor 902 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 904 and/or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memory 904 may comprise a single device or multiple devices that may be disposed on one or more dedicated memory devices or disposed on a processor or other similar device. When functions or steps are said to be "responsive to" or occur "in response to" a function or a process, the generally device functions or steps occur as a result of the function or message. It is not sufficient that a function or act merely follow or occur subsequent to another.

The memory 904 may also store a non-transitory computer code, executable by processor 902. The computer code may be written in any computer language, such as C, C++, assembly language, channel program code, and/or any combination of computer languages. The memory 904 may store information in data structures.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

The PiPS systems provide publish-subscribe functionality through an architecture that supports one or more publish-subscribe infrastructures. The PiPS systems provide seamless access to diverse publish-subscribe middleware enabling multiple independent publish-subscribe systems to run transparently, concurrently, and severally in response to one or more software applications. The PiPS system is extensible supporting new and developing publish-subscribe infrastructures besides supporting legacy systems. The systems support added publish-subscribe functionality, publish-subscribe enhancements, and modifications to existing publish-subscribe functionality without requiring changes to the applications and/or devices requesting publish-subscribe functionality. The architecture of the PiPS system is created through computational modules and interactions between those modules. This multi-module architecture allows functionality to be added to modules or removed by eliminating modules. The modules may be used within telephone systems and vehicles and may interface infotainment processor and digital signal processors or DSPs and co-exist and communicate with other system software. A vehicle may include without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle whether currently existing or after-arising this disclosure. In other words, it comprises a device or structure for transporting persons or things. The system is easy and quickly adapted to different vehicle and cabin types and different acoustic environments configurations.

Other systems, methods, features and advantages will be, or will become, apparent to one with skill in the art upon examination of the figures and detailed description. It is intended that all such additional systems, methods, features and advantages be included within this description, be within the scope of the disclosure, and be protected by the following claims.

What is claimed is:

1. A method, comprising:
   connecting a plurality of independent and diverse publish-subscribe messaging service systems and a platform-independent interface that is configured to exchange messages between publishers and subscribers via the plurality of diverse publish-subscribe messaging service systems, the platform-independent interface integrating a session layer, a presentation layer, and an application layer;
   connecting a software application and the platform-independent interface, wherein the software application comprises a client of the platform-independent interface and the platform-independent interface is configured to encapsulate the plurality of diverse publish-subscribe messaging service systems from the software application and the publishers and subscribers;
   exchanging, through the platform-independent interface, a plurality of messages between two or more of the diverse publish-subscribe messaging service systems and the software application, the exchanging including:
      translating by the presentation layer messages from the software application into different formats of the respective two or more of the diverse publish-subscribe messaging service systems;
      translating by the presentation layer messages from the two or more of the diverse publish-subscribe messaging service systems into a format of the software application;
      receiving by the software application requests for data from the subscribers of the two or more of the diverse publish-subscribe messaging service systems; and
      in response to receiving by the software application requests from the subscribers, dispatching by the software application the requested data to the subscribers of the two or more diverse publish-subscribe messaging service systems;
   controlling by the session layer connections between the software application and the two or more of the diverse publish-subscribe messaging service systems; and
   assigning, by the platform-independent interface, an affinity status to one or more of the plurality of diverse publish-subscribe messaging service systems in response to a prior publish-subscribe message exchange with the software application;

wherein the two or more publish-subscribe messaging service systems run concurrently.

2. The method of claim 1, wherein the software application executes a plurality of threads.

3. The method of claim 1, wherein the software application is included in a multimedia system.

4. The method of claim 1, wherein the software application is included in a vehicle and the software application controls the vehicle's operation.

5. The method of claim 1, wherein the application layer assigns the affinity status.

6. The method of claim 1, wherein the affinity status is assigned during an initialization of the platform-independent interface.

7. The method of claim 1, wherein the platform-independent interface manages topics, publications, and namespaces remote from the plurality of diverse publish-subscribe messaging service systems.

8. The method of claim 1, wherein the platform-independent interface comprises a publish-subscribe stub.

9. The method of claim 1, wherein a processor accessing a memory executes the connections and the exchange of a plurality of messages.

10. A publish-subscribe system, comprising:
a processor configured to:
connect a plurality of independent and diverse publish-subscribe messaging service systems and a platform-independent interface that is configured to exchange messages between publishers and subscribers via the plurality of diverse publish-subscribe messaging service systems, the platform-independent interface integrating a session layer, a presentation layer, and an application layer;
connect a software application and the platform-independent interface, wherein the software application comprises a client of the platform-independent interface and the platform-independent interface is configured to encapsulate the plurality of diverse publish-subscribe messaging service systems from the software application and the publishers and subscribers;
exchange, through the platform-independent interface, a plurality of messages between two or more of the diverse publish-subscribe messaging service systems and the software application, wherein the exchange includes configuring the processor to:
translate by the presentation layer messages from the software application into different formats of the respective two or more of the diverse publish-subscribe messaging service systems;
translate by the presentation layer messages from the two or more of the diverse publish-subscribe messaging service systems into a format of the software application;
receive by the software application requests for data from the subscribers of the two or more of the diverse publish-subscribe messaging service systems; and
in response to receiving by the software application requests from the subscribers, dispatch by the software application the requested data to the subscribers of the two or more diverse publish-subscribe messaging service systems;
control by the session layer connections between the software application and the two or more of the diverse publish-subscribe messaging service systems; and
assign, by the platform-independent interface, an affinity status to one or more of the plurality of diverse publish-subscribe messaging service systems in response to a prior publish-subscribe message exchange with the software application;

wherein the two or more publish-subscribe messaging service systems run concurrently.

11. The system of claim 10, wherein the software application executes a plurality of threads.

12. The system of claim 10, wherein the software application is included in a multimedia system.

13. The system of claim 10, wherein the software application is included in a vehicle and the software application controls the vehicle's operation.

14. The system of claim 10, wherein the application layer assigns the affinity status.

15. The system of claim 10, wherein the affinity status is assigned during an initialization of the platform-independent interface.

16. The system of claim 10, wherein the platform-independent interface manages topics, publications, and namespaces remote from the plurality of diverse publish-subscribe messaging service systems.

17. The system of claim 10, wherein the platform-independent interface comprises a publish-subscribe stub.

18. The system of claim 10, wherein the processor accessing a memory executes the connections and the exchange of a plurality of messages.

19. A non-transitory machine-readable medium encoded with processor-executable instructions, wherein the processor-executable instructions, when executed by the processor, are to cause the processor to:
connect a plurality of independent and diverse publish-subscribe messaging service systems and a platform-independent interface that is configured to exchange messages between publishers and subscribers via the plurality of diverse publish-subscribe messaging service systems, the platform-independent interface integrating a session layer, a presentation layer, and an application layer;
connect a software application and the platform-independent interface, wherein the software application comprises a client of the platform-independent interface and the platform-independent interface is configured to encapsulate the plurality of diverse publish-subscribe messaging service systems from the software application and the publishers and subscribers;
exchange, through the platform-independent interface, a plurality of messages between two or more of the diverse publish-subscribe messaging service systems and the software application, the exchange including causing the processor to:
translate by the presentation layer messages from the software application into different formats of the respective two or more of the diverse publish-subscribe messaging service systems;
translate by the presentation layer messages from the two or more of the diverse publish-subscribe messaging service systems into a format of the software application;
receive by the software application requests for data from the subscribers of the two or more of the diverse publish-subscribe messaging service systems; and in response to receiving by the software application requests from the subscribers, dispatch by the software application the requested data to the subscribers of the two or more diverse publish-subscribe messaging service systems;

control by the session layer connections between the software application and the two or more of the diverse publish-subscribe messaging service systems; and assign, by the platform-independent interface, an affinity status to one or more of the plurality of diverse publish-subscribe messaging service systems in response to a prior publish-subscribe message exchange with the software application;

wherein the two or more publish-subscribe messaging service systems run concurrently.

20. The method of claim 1, wherein at least one of the exchanged messages is sent by the software application and includes a unique identifier of a recipient end-point for use by an end-point to filter data samples.

21. The system of claim 10, wherein at least one of the exchanged messages is sent by the software application and includes a unique identifier of a recipient end-point for use by an end-point to filter data samples.

22. The method of claim 1, wherein the affinity status includes a preference that causes the platform independent interface to route future publish-subscribe requests to the one or more of the plurality of diverse publish-subscribe messaging service systems.

23. The system of claim 10, wherein the affinity status includes a preference that causes the platform independent interface to route future publish-subscribe requests to the one or more of the plurality of diverse publish-subscribe messaging service systems.

24. The method of claim 1, further comprising:
registering one or more of the plurality of diverse publish-subscribe messaging service systems with the platform independent interface;
receiving, through the platform-independent interface, a request for a list of registered publish-subscribe messaging service systems; and
in response to the request, providing the list of registered publish-subscribe messaging service systems.

25. The system of claim 10, the processor further configured to:
register one or more of the plurality of diverse publish-subscribe messaging service systems with the platform independent interface;
receive, through the platform-independent interface, a request for a list of registered publish-subscribe messaging service systems; and
in response to the request, provide the list of registered publish-subscribe messaging service systems.

26. The method of claim 1, wherein assigning, by the platform-independent interface, the affinity status includes assigning, by the application layer of the platform-independent interface, the affinity status.

27. The method of claim 1, wherein the format of the messages from the software application is different from the different formats of the messages from the respective two or more diverse publish-subscribe messaging service systems.

* * * * *